July 1, 1930.  C. H. CUNO  1,769,502

AUTOMATIC FILTER

Filed Nov. 13, 1929

INVENTOR
Charles H. Cuno,
BY
ATTORNEY

Patented July 1, 1930

1,769,502

UNITED STATES PATENT OFFICE

CHARLES H. CUNO, OF MERIDEN, CONNECTICUT, ASSIGNOR TO THE CUNO ENGINEERING CORPORATION, OF MERIDEN, CONNECTICUT, A CORPORATION OF CONNECTICUT

AUTOMATIC FILTER

Application filed November 13, 1929. Serial No. 406,862.

My invention relates to filters or strainers and has for its main object to provide a simple, reliable construction for effectively filtering liquids or gases and automatically cleaning the filter so as to prevent it from becoming clogged.

The invention is especially directed to filters of the multiple plate type such as shown in my former Patent 1,657,346. In such constructions the fluid is passed between spaced plates, and these plates from time to time are cleaned by the rotation of the plates or by the movement of cleaners or scrapers between the plates. In my former application 356,515 filed April 19, 1929, I have shown and claimed broadly mechanism of the above character provided with means for intermittently cleaning the filter plates. In that particular construction an automatic action is brought about by changes in pressure of the oil or other fluid.

My present invention has for one object the provision of a mechanism which will maintain the cleaning operation with substantial continuity. I have sought particularly to construct a device which is simple, easily installed and inspected and reliable to a maximum degree. I have also sought to provide such a construction which the filter will continue to operate even though the automatic cleaning mechanism should become inoperative for any reason.

In its preferred form the mechanism comprises a casing having an inlet and an outlet, the filtering and actuating mechanism, being entirely enclosed.

The spaced plates are carried by a frame supported from a head and driven by a reduction gear mechanism operated by the flow of fluid through the casing.

Figure 1:
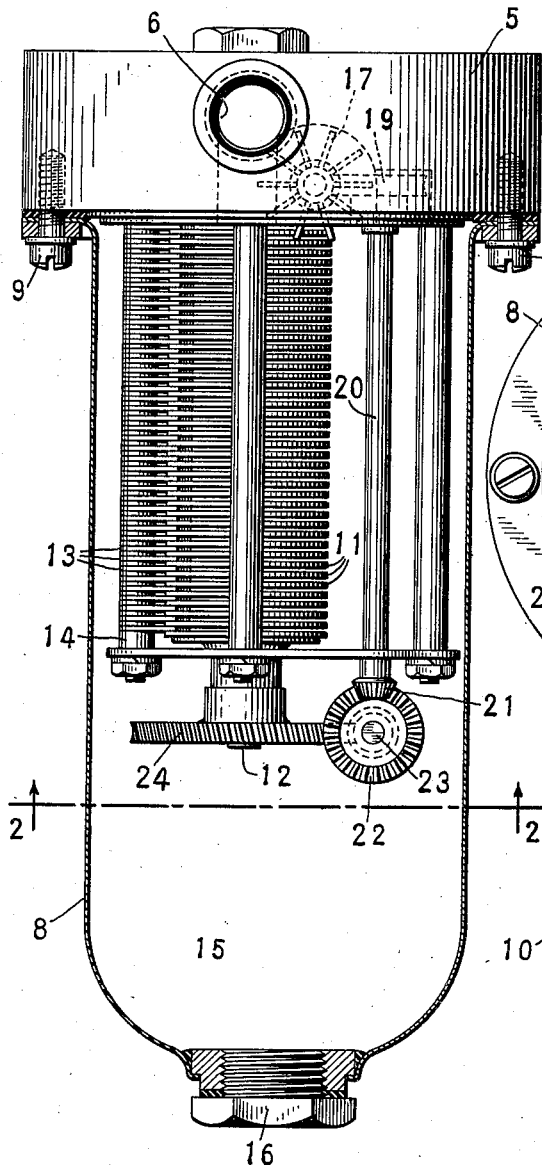
Fig. 1 is a side view of one form of mechanism embodying my invention, the casing being shown in section.
Figure 2:
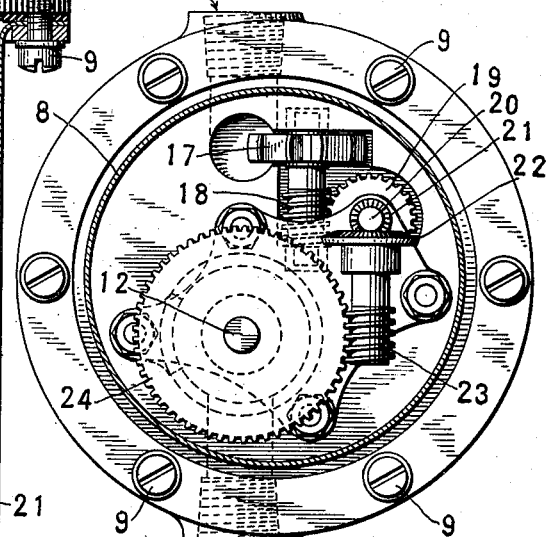
Fig. 2 is a horizontal section on the plane of the line 2—2 of Fig. 1 looking upwardly.
Figure 3:
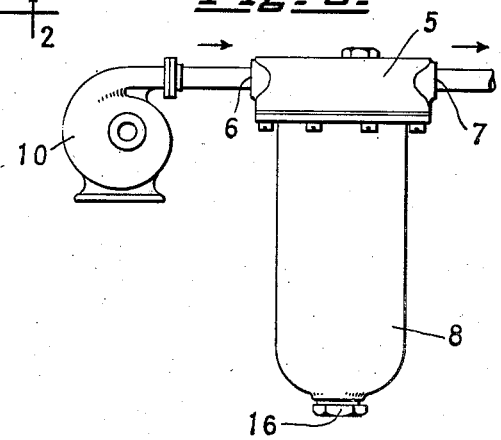
Fig. 3 illustrates diagrammatically the device located in a pump system.

Some part of the casing—for instance, the head 5 has an inlet 6 and an outlet 7. The lower part of the casing 8 which forms a sump is secured to the head in any suitable manner preferably by removable screws or bolts 9. It will be understood that the filter is located in a pipe line and may be fed by pump 10.

The plates 11 are mounted on shaft 12 and spaced apart from each other in the usual manner. Cleaner or scraper plates 13 are supported on a rod 14 and interposed or adapted to be interposed between the adjacent edges of the filter plates.

It will be understood that the fluid to be strained or filtered passes inwardly through the inlet 6 into the chamber 15 in the casing 8 and then passes between the plates 11 into the interior and out through the discharge 7 leaving solids in the chamber 15 and clinging to the edges of the plates 11. It will be understood of course that the spaces between the plates 11 will be thin enough to hold back the material which it is not desired to have pass through. By rotating the plates 11 the scraper plates 13 are brought into play to scrape or wipe off the foreign matter from and at the edges of the plates 11 and from between the plates.

The matter which is scraped off will of course collect in the bottom of the casing and can be removed either by removing the casing or by removing the plug 16 from the bottom of the casing.

To operate the filter automatically I provide a sort of paddle wheel 17 which is supported in the head 5 and located with one edge in the path of movement of the liquid passing inwardly through the head. Power is transmitted from the wheel 17 to the shaft 12 by a reduction gear train consisting of the worm 18, worm wheel 19, shaft 20, bevel pinion 21, bevel gear 22, worm 23 and worm gear 24 which is on the shaft 12.

In this way a very large gear reduction can be obtained by means of these various worms and gears. The speed of movement can be regulated by adjusting the position of the wheel 17 relative to the inlet (or outlet as the case may be) or, vice versa, by adjusting the inlet with respect to the wheel so as to make more or less oil flow pass the edges of the wheel.

It will be seen from the foregoing that the filter plates as well as the actuating mechanism are entirely enclosed and protected and in fact the entire gear mechanism runs in oil when the device is used for filtering oil. It will be seen that the filtering plates will continue to act as such even though the wheel 17 should for any reason cease to revolve. If desired I may provide exterior means driven by a projection from the interior to indicate the rotation of the filter plates.

Such constructions are particularly adapted for use in filtering the oil for motor vehicles where compactness, simplicity and reliability are of great importance.

While the filter is intended primarily for liquids it should be understood that the broad invention might be employed to filter or strain gases or other fluids.

I claim:

1. A filter comprising a head having inlet and outlet passages, a frame supported by the head, a series of spaced plates mounted to rotate between said head and frame, a series of cleaner members arranged to scrape the spaces between the edges of said plates, a wheel rotatable by the flow of liquid through said passages, a reduction gear train supported in said frame for transmitting power from said wheel to said plates, and a casing surrounding said plates and gear train.

2. An oil filter comprising a set of spaced filter plates, a set of scraper plates located between the edges of the filter plates, a casing enclosing all of said plates and having an inlet and an outlet, a rotatable pressure actuated member driven by the passage of oil within the casing and a reduction gear train immersed in the oil for rotating one of said sets of plates.

3. A filter comprising a head, a frame supported by the head, a series of spaced plates mounted to rotate between said head and frame, a series of cleaner members arranged to scrape the spaces between the edges of said plates, a wheel rotatable by the flow of liquid through said filter, a reduction gear train supported by said frame for transmitting power from said wheel to said plates, and a casing surrounding said plates and gear train and forming a collecting sump beneath said plates.

4. An oil filter comprising a set of spaced filter plates, a set of scrapers located between the edges of the filter plates, a casing enclosing said plates and scrapers and having an inlet and an outlet, a rotatable member driven by the passage of oil through the casing and a reduction gear train immersed in the oil for rotating said set of filter plates.

5. A filter comprising a head having a passage, spaced filtering plates supported by said head, cleaning scrapers carried by said head between said plates, a rotating wheel having vanes located adjacent said passage, and a reduction gear train supported by the head for rotating the filtering plates.

6. A filter comprising a head having a passage, a frame supported by the head, a series of spaced plates mounted to rotate between said head and frame, a series of cleaner members arranged to scrape the spaces between the edges of said plates, a wheel rotatable by the flow of liquid through said passage, a reduction gear train supported in said frame for transmitting power from said wheel to said plates and a casing surrounding said plates and gear train and having an outlet.

CHARLES H. CUNO.